(12) United States Patent
Lövgren et al.

(10) Patent No.: US 8,864,103 B2
(45) Date of Patent: Oct. 21, 2014

(54) VALVE ACTUATOR

(75) Inventors: Torbjörn Lövgren, Kode (SE); Pontus Louis Claesson, Helsingborg (SE)

(73) Assignee: Aktiebolaget SKF, Gothenburg (SE)

( * ) Notice: Subject to any disclaimer, the term of this patent is extended or adjusted under 35 U.S.C. 154(b) by 341 days.

(21) Appl. No.: 12/681,031

(22) PCT Filed: Sep. 23, 2008

(86) PCT No.: PCT/SE2008/000524
§ 371 (c)(1),
(2), (4) Date: Mar. 31, 2010

(87) PCT Pub. No.: WO2009/045140
PCT Pub. Date: Apr. 9, 2009

(65) Prior Publication Data
US 2010/0270485 A1    Oct. 28, 2010

(30) Foreign Application Priority Data

Oct. 2, 2007  (SE) ........................... 0702212

(51) Int. Cl.
| | |
|---|---|
| *F16K 31/50* | (2006.01) |
| *F16K 35/16* | (2006.01) |
| *F16K 31/04* | (2006.01) |
| *F16K 27/02* | (2006.01) |
| *H02K 7/06* | (2006.01) |

(52) U.S. Cl.
CPC ............... *H02K 7/06* (2013.01); *F16K 31/047* (2013.01)
USPC ........................... 251/71; 251/69; 251/129.11

(58) Field of Classification Search
USPC ........ 251/68, 69, 70, 71, 90, 93, 111, 129.11, 251/336, 129.03, 129.12, 129.13; 74/424.71
See application file for complete search history.

(56) References Cited

U.S. PATENT DOCUMENTS

| | | | | |
|---|---|---|---|---|
| 777,373 | A | * | 12/1904 | Howard ........................... 251/77 |
| 2,930,571 | A | * | 3/1960 | Vogl ............................... 251/69 |

(Continued)

FOREIGN PATENT DOCUMENTS

| | | |
|---|---|---|
| DE | 4423313 A1 | 1/1996 |
| WO | WO0114775 A1 | 3/2001 |
| WO | WO2004065832 A1 | 8/2004 |

OTHER PUBLICATIONS

Machine translation of DE 4423313, (cited by Applicant) published Jan. 4, 1996.*

*Primary Examiner* — Stephen M Hepperle
*Assistant Examiner* — Seth W MacKay-Smith
(74) *Attorney, Agent, or Firm* — Bryan Peckjian; SKF USA Inc. Patent Department (57) ABSTRACT

The invention concerns a valve actuator (1) comprising a housing (2) and a nut and screw arrangement. A first portion (5) of the nut and screw arrangement is operated by an electric motor (7), which is fixed to the housing (2). A means (8) is in contact with a second portion (6) of the nut and screw arrangement, and a resilient means (9) is acting between the means (8) and the housing (2). A relative rotation between the threaded nut (3) and the threaded screw (4) leads to a translation of the means (8) and an energizing or de-energizing of the resilient means (9). A locking means (10) locks the resilient means (9) in an energized state by locking the relative rotation of the nut and screw arrangement. When the locking means (10) are released, the resilient means (9), when de-energizing, acts on the means (8), leading to a translation of the means (8).

11 Claims, 5 Drawing Sheets

(56) References Cited

U.S. PATENT DOCUMENTS

| | | | |
|---|---|---|---|
| 3,137,475 A * | 6/1964 | Schoenecker et al. | 251/69 |
| 3,640,140 A * | 2/1972 | Gulick et al. | 74/89.38 |
| 5,184,593 A | 2/1993 | Kobayashi | |
| 5,195,721 A * | 3/1993 | Akkerman | 251/129.13 |
| 5,983,743 A * | 11/1999 | McGregor et al. | 74/89.23 |
| 5,984,260 A * | 11/1999 | Rawson et al. | 251/71 |
| 6,446,519 B1 * | 9/2002 | Biester | 74/89.16 |
| 6,488,260 B1 * | 12/2002 | Dietz | 251/129.13 |
| 6,561,480 B1 | 5/2003 | Komiya et al. | |
| 2008/0083892 A1 * | 4/2008 | Fenton | 251/68 |

* cited by examiner

VALVE ACTUATOR

FIELD OF THE INVENTION

According to a first aspect, the invention concerns a valve actuator.

According to a second aspect, the invention concerns an emergency valve actuator device.

According to a third aspect, the invention concerns a valve actuator device.

BACKGROUND

Valve actuators may be used to control valve operations, e.g. open or closing a valve. In most cases, e.g. during normal operation of the system comprising the valve, it is wanted to perform these operations in a controlled manner. However, in case of an emergency it may be needed to automatically open or close the valve, even during loss of power. This is especially important when used as a part of an underwater valve system, where leakage of fluids may be especially harmful to the environment.

EP1210538 discloses an underwater valve actuator comprising an actuator stem that extends from a housing, which contains a sleeve. The actuator stem is driven to cause the sleeve to compress a stack of springs within the housing until bolts engage the sleeve. The springs are then locked in a compressed state. At the same time an armature on the actuator stem is attracted to an electromagnet within the housing. The actuator stem can then be driven to open or close a valve in a controlled manner without first compressing or releasing the springs. In an emergency, the electromagnet is switched off, releasing the armature thus unlocking the stack of springs. The released springs push the piston which partially retracts the actuator stem into the housing causing the valve to close.

However, this solution has several disadvantages. Due to that the motor, the bearing arrangement and the sleeve perform a translation movement during energizing and de-energizing of the stack of springs, high precision tolerances are required. Furthermore, since the motor must be moved back and forth, electrical connections to the motor need to allow movement too, which increases the risk of cable break. The stack of springs is acting directly upon the motor and the bearing arrangement, thus causing them to receive large loads. Another disadvantage is the locking means, which is supposed to directly bear the full load of the arrangement comprising the spring, the sleeve, the motor, the bearing etc. by blocking the arrangements linear movement. Consequently, it has to be dimensioned to withstand large loads, thus requiring a more expensive magnet, and perhaps also more space.

WO2004/065832 discloses a motor-controlled actuator for regulating a valve. An actuator element is moved in a rectilinear movement within two extreme positions, controlled by an electric motor, whose rotating movement is converted to the rectilinear movement by means of a threaded spindle and a nut. A spring is acting in the movement direction of the actuator element, causing the electric motor and the actuator element to move to one of the two extreme positions in case of loss of power.

A disadvantage with this design is the movable motor that causes similar problems as to those in EP1210538. Another disadvantage is the holding device that acts in the opposite direction of the spring force. In WO2004/065832 an electromagnet is described as the holding device, but the use of a latch is also suggested. However, if the valve actuator is of large dimensions, which for instance is required when used deep under water, a high force and/or high energy consumption is needed to hold the electric motor with such a design.

SUMMARY OF INVENTION

An object of the invention is to provide a valve actuator that is compact and highly reliable.

According to the first aspect of the invention, the object is achieved by a valve actuator comprising a housing and a nut and screw arrangement with a threaded nut receiving a threaded screw that extends through the threaded nut. The nut and screw arrangement is not self-locking, i.e. the lead angle is larger than the friction angle. The nut and screw arrangement is further having a first and a second portion. The first portion is one of the threaded nut and the threaded screw, and the second portion is the other one of the threaded nut and the threaded screw. The first portion of the nut and screw arrangement is operated by an electric motor for generating a relative rotation between the threaded nut and the threaded screw, and the electric motor is fixed to the housing. The electric motor is fixed to the housing so that it is not movable inside the housing, but is still able to operate as a motor, i.e. to generate a rotation of the first portion of the nut and screw arrangement. A means is in contact with the second portion of the nut and screw arrangement. The means is preferably, but not necessarily, fixed to the second portion of the nut and screw arrangement. The means is locked against rotation in the housing. This may for instance be achieved by a linear spline, a pin in a groove, a key in a keyway, or by a form-lock, e.g. the means and the housing are mounted with a fit, and the means presents a different shape then the inside shape of the housing. A resilient means is acting between the means and the housing. The resilient means is operating between an energized and de-energized state, and a relative rotation between the threaded nut and the threaded screw is leading to a translation of the means and an energizing or de-energizing of the resilient means. The valve actuator further comprises a locking means for locking the resilient means in an energized state by locking the relative rotation between the threaded nut and the threaded screw. When releasing the locking means, the resilient means, when de-energizing, acts on the means, leading to a translation of the means. The translation of the means is further leading to a relative rotation and translation between the threaded nut and the threaded screw.

By having the electric motor fixed to and thus in contact with the housing, cooling of the electric motor is improved. This effect is increased if the valve actuator is located under water. Still, the valve actuator is well suited to operate above water. The fixed electric motor also means that fewer movable parts are required, leading to an increased reliability of the valve actuator.

In an embodiment, the nut and screw arrangement comprises any of a roller screw or a ball screw.

In an embodiment, the resilient means is any of a spring, a coil spring, a helical compression spring, a disc spring, or a spring washer.

In an embodiment, the locking means is any of a tooth clutch, a tooth brake, a torque lock, or a friction brake. A tooth clutch, or tooth brake may be activated and de-activated by e.g. an electromagnet, and is a compact solution. A torque lock is preferably applied to the electric motor, preferably through the electronic control unit or program associated to the electric motor. By using a torque lock the number of components may be reduced, thus reducing size and weight and increasing freedom of design. The locking means can be arranged to act on any of the threaded screw, the threaded nut or the electric motor. By using a rotational lock as locking means, less locking force and energy is required.

In an embodiment, the locking means locks the rotation of at least one of the electric motor, the threaded screw or the threaded nut.

In an embodiment, the housing further comprises a support portion that the resilient means acts upon. The support portion may for instance be a collar, a neck, or a thickened portion. A support portion may be used to strengthen, or improve the contact of the part of the housing that the resilient means acts upon. It may also be possible to choose against where in the housing the resilient means should act upon.

In an embodiment, the valve actuator further comprises an extension means connected to the means, and where the extension means is having a connecting means for receiving a valve part. The extension means may for instance be a tube, a pipe, or a cylinder. Furthermore, the extension means may be integrated with the threaded screw, e.g. they may joined by welding or another joining process, or the extension means is an extension of the threaded screw.

The connecting means may for instance be a snap fit connection, a form-locking connection, or a screw connection.

In an embodiment, the extension means extends through a hole in the housing.

In an embodiment the means is any of a plate, a disc, a sleeve, or a cylinder.

In an embodiment, the means is a damper means. The means may be designed so as to have a dampering effect on the translation movement. For example, there may be a gap between the means and the inside of the housing, causing a dampering effect when the means is in motion. The means may also have one or several through holes, depending on the wanted degree of dampering.

In an embodiment, the valve actuator housing is filled with a fluid. The fluid may be air, a gas or a liquid. Depending on the fluid filled into the housing, the dampering effect may be increased. Furthermore, if the valve actuator is used in a high pressure environment such as deep under water, oil or a fluid having a similar viscosity as the surrounding fluid will prevent the valve actuator housing from imploding.

In an embodiment, the valve actuator comprises a valve part that is fixed to the connecting means.

According to the second aspect of the invention, an emergency valve actuator device is disclosed. It comprises the valve actuator according to the first aspect of the invention, and further comprising a valve part that controls a valve. All features and embodiments of the first aspect of the invention are applicable to the second aspect of the invention and vice versa.

In an embodiment, the valve part closes the valve when the resilient means de-energizes. This is advantageous in applications where it is needed to automatically shut off e.g. a fluid flow in a pipe, or similar, in order to prevent leakage, waste etc.

In an embodiment, the valve part opens the valve when the resilient means de-energizes. This is advantageous in applications where it is needed to automatically release e.g. a fluid flow in a pipe, or similar. This may be wanted in order to reduce the system pressure, redirect a flow etc.

According to the third aspect of the invention, a valve actuator device is disclosed. It comprises the valve actuator according to the first aspect of the invention, and further comprising a valve part that controls a valve. All features and embodiments of the first aspect of the invention are applicable to the second aspect of the invention and vice versa.

In an embodiment, the valve part 13 is moved in a controlled manner in a first direction when the electric motor 7 generates a relative rotation in a first direction between the threaded nut 3 and the threaded screw 4.

In an embodiment, the valve part 13 is moved in a controlled manner in a second direction when the electric motor 7 generates a relative rotation in a second direction between the threaded nut 3 and the threaded screw 4.

By controlling the operation of the electric motor 7 the valve part 13 may be moved to a wanted position in a controlled manner. It is thus possible, in a controlled manner, to fully open and close the valve and to move the valve part 13 so that the valve is partly opened/closed.

DETAILED DESCRIPTION OF THE INVENTION

Figure 1:
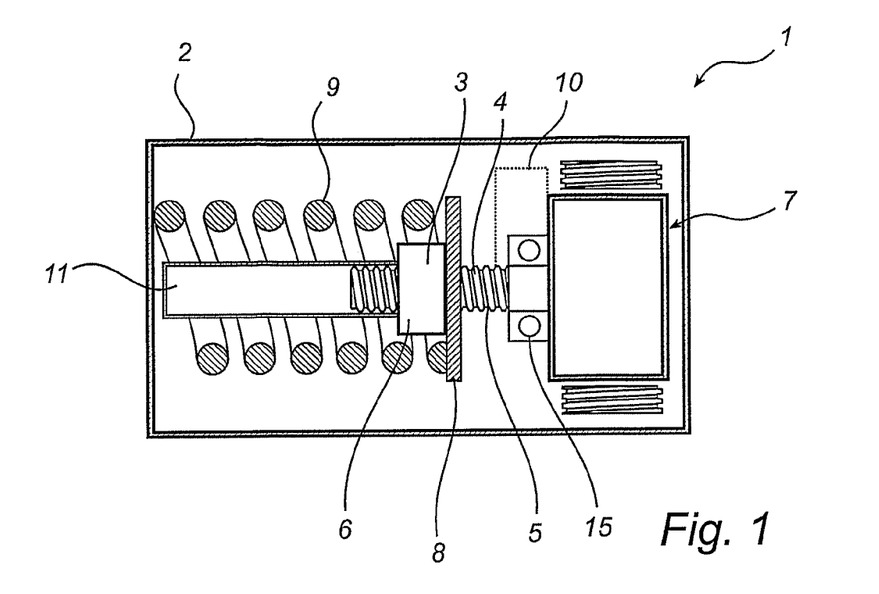
FIG. 1: A schematic view of a valve actuator according to an embodiment of the invention.

In FIG. 1, a schematic view of a valve actuator according to an embodiment of the invention is shown. The valve actuator 1 comprises a housing 2 and a nut and screw arrangement with a threaded nut 3 and a threaded screw 4. The threaded screw 4 extends through the threaded nut 3, and the nut and screw arrangement presents a first 5 and a second portion 6. In this embodiment the first portion 5 is the threaded screw 4, and the second portion 6 is the threaded nut 3. The first portion 5 of the nut and screw arrangement, i.e. the threaded screw 4 is operated by an electric motor 7 in order to generate a relative rotation between the threaded nut 3 and the threaded screw 4. The electric motor 7 is fixed to the housing 2, and is thus not movable inside the housing 2. The electric motor 7 and the threaded screw 4 are supported by one or a plurality of bearings 15. A means 8 is in contact with the threaded nut 3. In this embodiment the means 8 is fixed to the threaded nut 3. A resilient means 9 acts between the means 8 and the housing 2. The resilient means 9 operates between an energized and de-energized state, and a relative rotation between the threaded nut 3 and the threaded screw 4 leads to a translation of the means 8 and an energizing or de-energizing of the resilient means 9. In this embodiment, the resilient means 9 is in an essentially de-energized state. An extension means 11 is connected to the means 8. The extension means 11 is also having a connecting means (not shown) for receiving a valve part (not shown). When the electric motor 7 is operated, the threaded screw 4 rotates, causing the threaded nut 3 to perform a translation movement in relation to the threaded screw 4 and the housing 2. Depending on how the electric motor 7 is operated, the threaded screw 4 will rotate in different directions, thus causing the threaded nut 3 to move in different directions. If the threaded screw 4 rotates so that the threaded nut 3 is driven away from the electric motor 7, the threaded nut 3 causes the means 8 to move in the same direction, further leading to that the resilient means 9 starts energizing while compressing. At the same time, the extension means 11 is also forced to move in the same direction as the means 8 and the threaded nut 3. When the means 8 is in a wanted position, a locking means 10 is activated which locks the relative rotation between the threaded nut 3 and the threaded screw 4 and also locks the resilient means 9 in an energized state. The locking means 10 is activated and de-activated for instance by an electromagnet (not shown) or another electrical control (not shown). In case of loss of power, the locking means 10 is automatically de-activated, thus releasing the lock of the threaded nut 3 and threaded screw 4 allowing them to rotate relatively. The resilient means 9 will then de-energize and act on the means 8, leading to a translation of the means 8 in the direction towards the electric motor 7.

It should be understood that the valve actuator may comprise other components, e.g. seals, lubrication, bearings.

Figure 2:
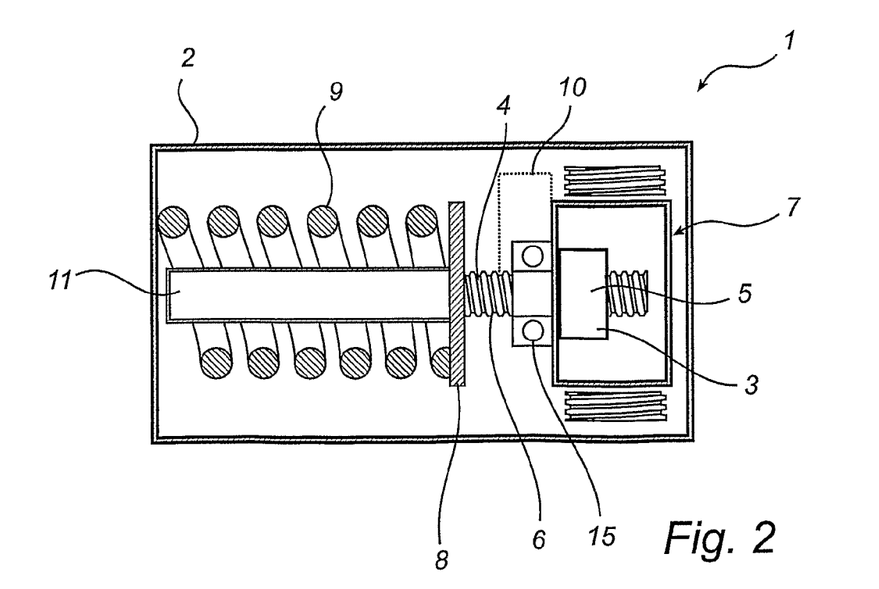
FIG. 2: A schematic view of a valve actuator according to an embodiment of the invention.

In FIG. 2, a schematic view of a valve actuator according to an embodiment of the invention is shown. The valve actuator 1 comprises a housing 2 and a nut and screw arrangement with a threaded nut 3 and a threaded screw 4. The threaded screw 4 extends through the threaded nut 3, and the nut and screw arrangement presents a first 5 and a second portion 6. In this embodiment the first portion 5 is the threaded nut 3, and the second portion 6 is the threaded screw 4. The first portion 5 of the nut and screw arrangement, i.e. the threaded nut 3 is operated by an electric motor 7 in order to generate a relative rotation between the threaded nut 3 and the threaded screw 4. The electric motor 7 is fixed to the housing 2, and is thus not movable inside the housing 2. The electric motor 7 and the threaded nut 3 are supported by one or a plurality of bearings 15. A means 8 is in contact with the threaded screw 4. In this embodiment, the means 8 is fixed to the threaded screw 4. A resilient means 9 acts between the means 8 and the housing 2. The resilient means 9 operates between an energized and de-energized state, and a relative rotation between the threaded nut 3 and the threaded screw 4 leads to a translation of the means 8 and an energizing or de-energizing of the resilient means 9. In this embodiment, the resilient means 9 is in an essentially de-energized state. An extension means 11 is connected to the means 8. In this embodiment, the extension means 11 is integrated with the threaded screw 4. The extension means 11 is also having a connecting means (not shown) for receiving a valve part (not shown). When the electric motor 7 is operated, the threaded nut 3 rotates, causing the threaded screw 4 to perform a translation movement in relation to the threaded nut 3 and the housing 2. Depending on how the electric motor 7 is operated, the threaded nut 3 will rotate in different directions, thus causing the threaded screw 4 to move in different directions. If the threaded nut 3 rotates so that the threaded screw is driven away from the electric motor 7, the threaded screw 4 causes the means 8 to move in the same direction, further leading to that the resilient means 9 starts energizing while compressing. At the same time, the extension means 11 is also forced to move in the same direction as the means 8 and the threaded nut 3. When the means 8 is in a wanted position, a locking means 10 is activated which locks the relative rotation between the threaded nut 3 and the threaded screw 4 and also locks the resilient means 9 in an energized state. The locking means 10 is activated and de-activated for instance by and electromagnet (not shown) or another electrical control (not shown). In case of loss of power, the locking means 10 is automatically de-activated, thus releasing the lock of the threaded nut 3 and threaded screw 4 allowing them to rotate relatively. The resilient means 9 will then de-energize and act on the means 8, leading to a translation of the means 8 in the direction towards the electric motor 7.

Figure 3:
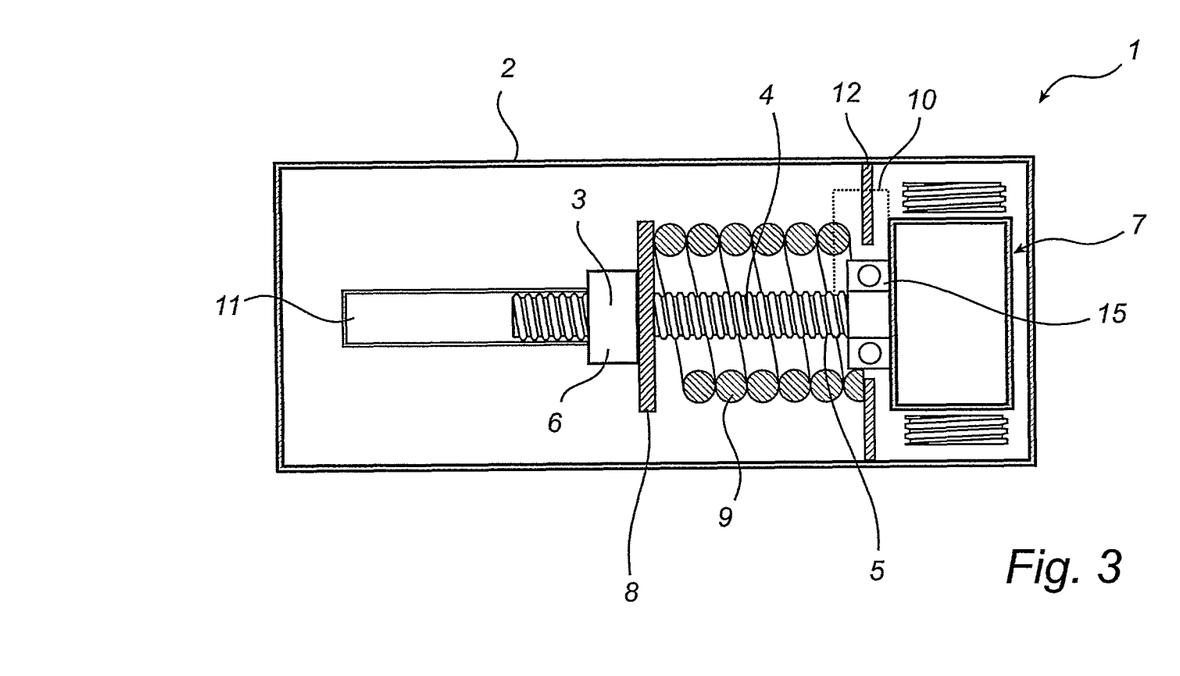
FIG. 3: A schematic view of a valve actuator according to an embodiment of the invention.

In FIG. 3, a schematic view of a valve actuator according to an embodiment of the invention is shown. It comprises the same features and components as the valve actuator shown in FIG. 1. However, in this embodiment, the resilient means 9 acts between the means 8 and a support portion 12 fixed to the housing 2. The resilient means 9 operates between an energized and de-energized state, and a relative rotation between the threaded nut 3 and the threaded screw 4 leads to a translation of the means 8 and an energizing or de-energizing of the resilient means 9. In this embodiment, the resilient means 9 is in an essentially de-energized state. An extension means 11 is connected to the means 8. The extension means 11 is also having a connecting means (not shown) for receiving a valve part (not shown). When the electric motor 7 is operated, the threaded screw 4 rotates, causing the threaded nut 3 to perform a translation movement in relation to the threaded screw 4 and the housing 2. Depending on how the electric motor 7 is operated, the threaded screw 4 will rotate in different directions, thus causing the threaded nut 3 to move in different directions. If the threaded screw 4 rotates so that the threaded nut 3 is driven away from the electric motor 7, the threaded nut 3 causes the means 8 to move in the same direction, further leading to that the resilient means 9 starts energizing while expanding. At the same time, the extension means 11 is also forced to move in the same direction as the means 8 and the threaded nut 3. When the means 8 is in a wanted position, a locking means 10 is activated which locks the relative rotation between the threaded nut 3 and the threaded screw 4 and also locks the resilient means 9 in an energized state. The locking means 10 is activated and de-activated for instance by and electromagnet (not shown) or another electrical control (not shown). In case of loss of power, the locking means 10 is automatically de-activated, thus releasing the lock of the threaded nut 3 and threaded screw 4 allowing them to rotate relatively. The resilient means 9 will then de-energize and act on the means 8, leading to a translation of the means 8 in the direction towards the electric motor 7.

Figure 4:
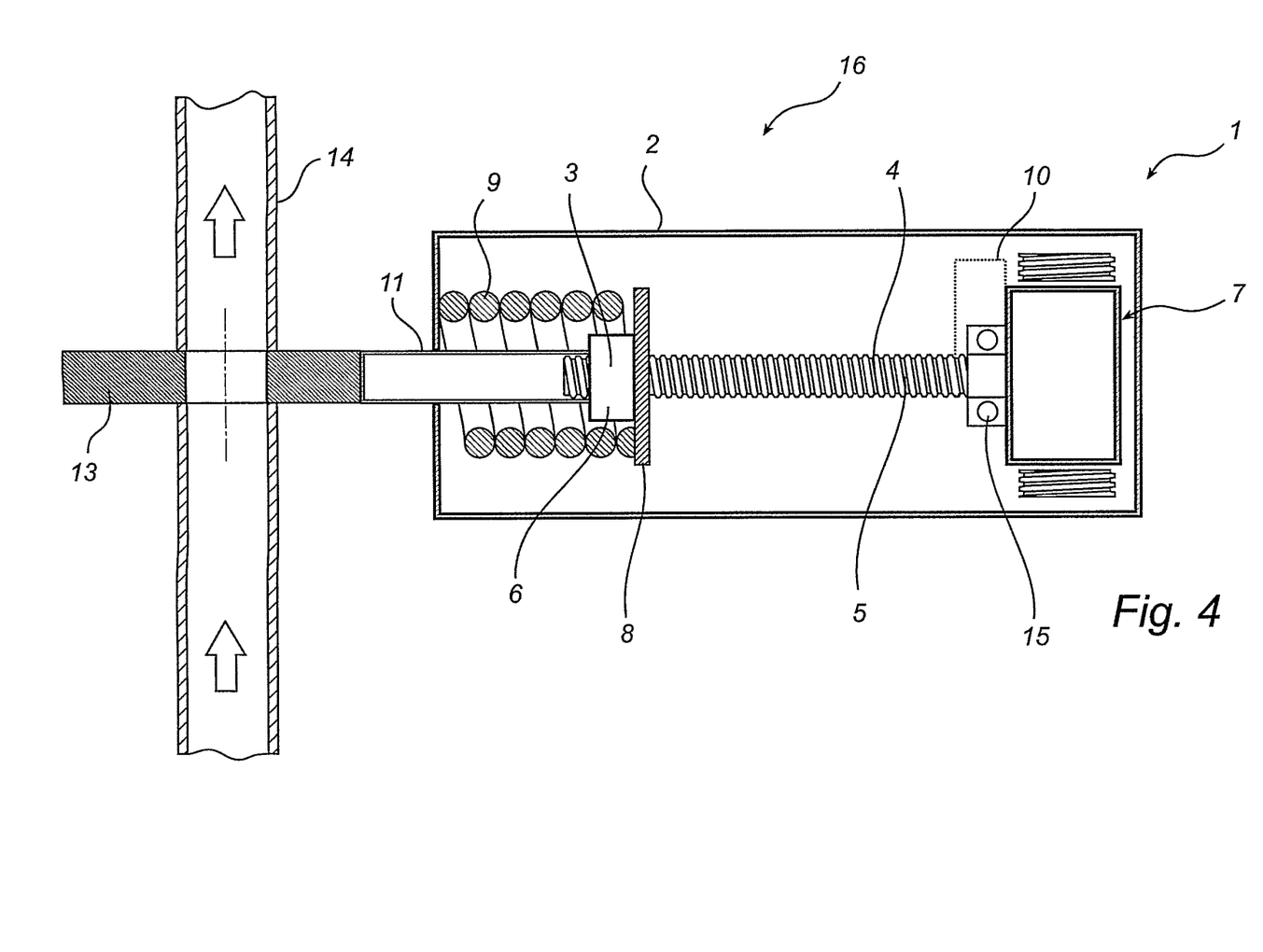
FIG. 4: A schematic view of an emergency valve actuator device according to an embodiment of the invention.
Figure 5:
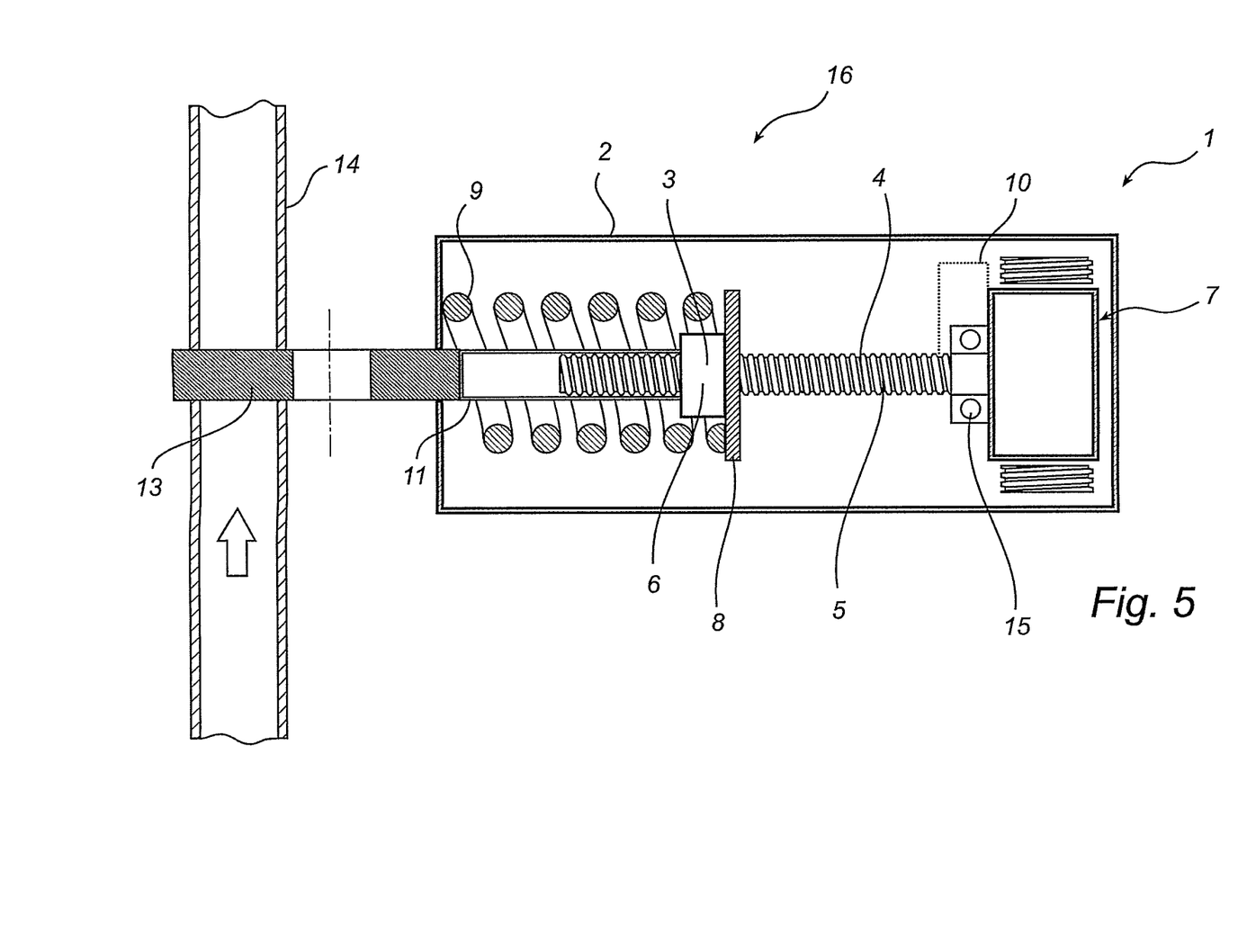
FIG. 5: A schematic view of an emergency valve actuator device according to an embodiment of the invention.

In FIG. 4, a schematic view of an emergency valve actuator device according to an embodiment of the invention is shown. It comprises the same features and components as the valve actuator shown in FIG. 1. Furthermore, a valve part 13 is connected to the connecting means (not shown) of the extension means 11. The valve part 13 is part of a valve (not shown) controlling a flow in a pipe 14. In this embodiment, the figure shows that the valve part 13 is adjusted so that the valve is open, allowing e.g. a fluid to flow through. The resilient means 9 is an energized, i.e. compressed state, and is together with the means 8 locked in this position. In case of loss of power, the locking means 10 is automatically de-activated, thus releasing the lock of the threaded nut 3 and threaded screw 4 allowing them to rotate relatively. The resilient means 9 will then de-energize and act on the means 8, leading to a translation of the means 8 in the direction towards the electric motor 7. The means 8 forces the valve part 13, via the extension means 11, to move in the same direction as the means 8, resulting in that the valve is closed, as shown in FIG. 5.

Figure 6:
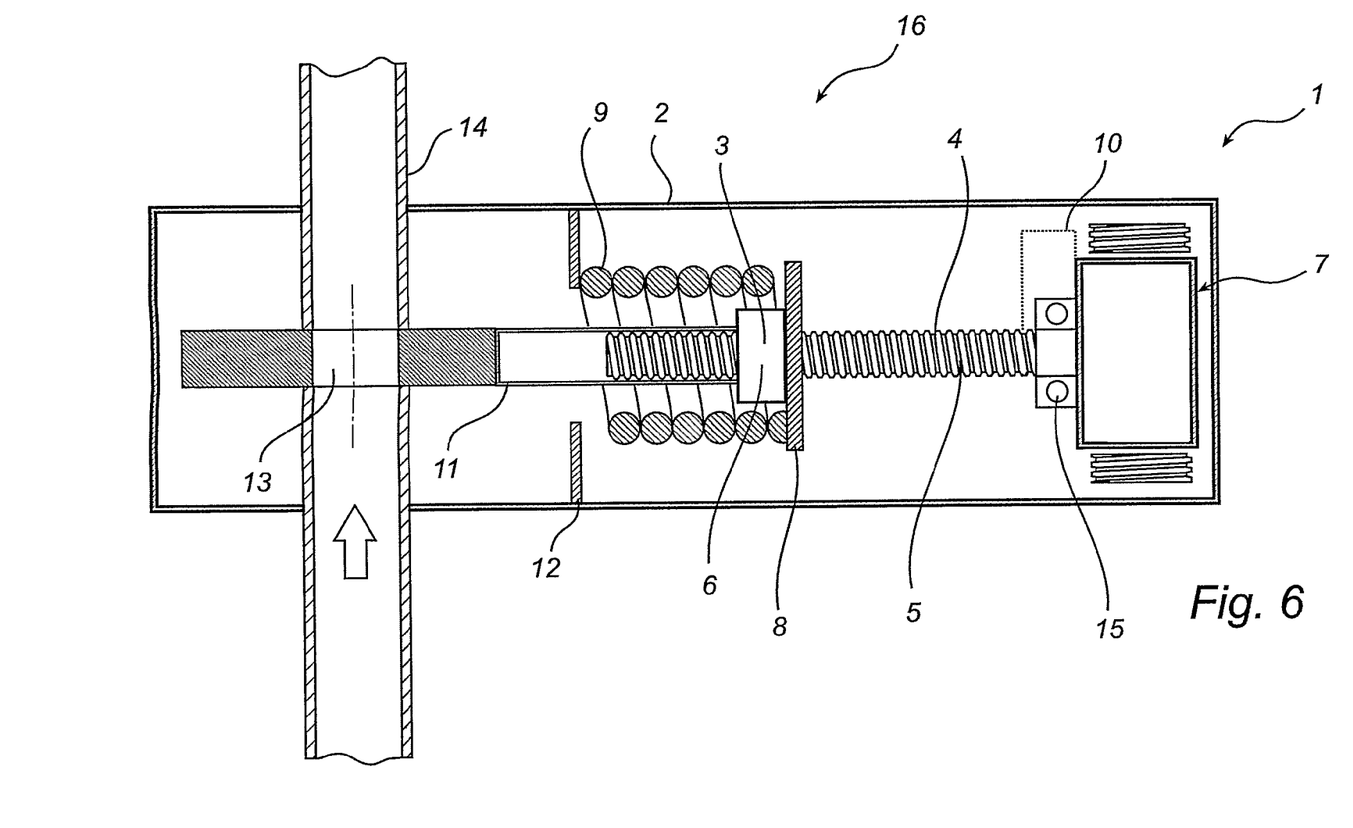
FIG. 6: A schematic view of an emergency valve actuator device according to an embodiment of the invention.

In FIG. 6, a schematic view of an emergency valve actuator device according to an embodiment of the invention is shown. It comprises the same features and components as the emergency valve actuator shown in FIG. 4. However, in this embodiment, the pipe 14 runs through a hole in the housing 2. In this embodiment, the resilient means 9 acts between the means 8 and a support portion 12 that is fixed to an inner wall of the housing 2.

The invention claimed is:

1. An electrically powered valve actuator connectable to a source of electricity for providing electricity to the valve actuator, the valve actuator comprising:

a housing, a threaded nut, a threaded screw extending through the threaded nut,
an electric motor fixed to the housing and configured to rotate a first one of the nut and the screw,
a contact member in contact with a second one of the nut and the screw, the contact member being axially and rotationally fixed to the second one of the nut and the screw when electricity is provided to the valve actuator and when electricity is not provided to the valve actuator and the contact member being locked against rotation in the housing when electricity is provided to the valve actuator and when electricity is not provided to the valve actuator,
a resilient member between the contact member and the housing configured to bias the contact member in a first direction relative to the housing and being shiftable between a first state and a second state, a potential energy of the resilient member being higher in the first state than in the second state, and
locking means for locking and unlocking the resilient member, the locking means having a locked condition and an unlocked condition, the locking means being configured to shift automatically to the unlocked condition in response to a stoppage of electricity being provided to the valve actuator, the locking means in the locked condition preventing relative rotation between the threaded nut and the threaded screw and the locking means in the unlocked condition allowing relative rotation between the threaded nut and the threaded screw and allowing the resilient member to shift to the second state,
wherein the locking means comprises one of a tooth clutch, a tooth brake, a torque lock, and a friction brake, and
wherein the resilient member comprises a spring or a spring washer or a disc spring, and
wherein the first one of the nut and the screw comprises the screw and wherein the locking means is configured to prevent relative rotation between the threaded nut and the threaded screw by preventing the threaded screw from rotating relative to the housing.

2. The valve actuator according to claim 1, wherein the second one of the nut and the screw comprises the screw and wherein the contact member is locked against axial movement relative to the screw when electricity is provided to the valve actuator and when electricity is not provided to the valve actuator.

3. The valve actuator according to claim 1, further including an extension member extending from the second one of the nut and the threaded screw and extending through an opening in the housing.

4. An electrically powered valve actuator connectable to a source of electricity for providing electricity to the valve actuator, the valve actuator comprising:
a housing,
a threaded nut,
a threaded screw extending through the threaded nut,
an electric motor fixed to the housing and configured to rotate a first one of the nut and the screw,
a contact member in contact with a second one of the nut and the screw, the contact member being axially and rotationally fixed to the second one of the nut and the screw when electricity is provided to the valve actuator and when electricity is not provided to the valve actuator and the contact member being locked against rotation in the housing when electricity is provided to the valve actuator and when electricity is not provided to the valve actuator,
a resilient member between the contact member and the housing configured to bias the contact member in a first direction relative to the housing and being shiftable between a first state and a second state, a potential energy of the resilient member being higher in the first state than in the second state, and
locking means for locking and unlocking the resilient member, the locking means having a locked condition and an unlocked condition, the locking means being configured to shift automatically to the unlocked condition in response to a stoppage of electricity being provided to the valve actuator, the locking means in the locked condition preventing relative rotation between the threaded nut and the threaded screw and the locking means in the unlocked condition allowing relative rotation between the threaded nut and the threaded screw and allowing the resilient member to shift to the second state,
wherein the locking means comprises one of a tooth clutch, a tooth brake, a torque lock, and a friction brake, and
further including a valve part connected to an extension member, the valve part being movable in a controlled manner in a first direction when the electric motor generates a relative rotation in a first direction between the threaded nut and the threaded screw and being movable in a controlled manner in a second direction when the electric motor generates a relative rotation in a second direction between the threaded nut and the threaded screw and further being movable to a desired position in a controlled manner to control a flow in a pipe.

5. An electrically powered valve actuator connectable to a source of electricity for providing electricity to the valve actuator, the valve actuator comprising:
a housing,
a threaded nut,
a threaded screw extending through the threaded nut,
an electric motor fixed to the housing and configured to rotate a first one of the nut and the screw,
a contact member in contact with a second one of the nut and the screw, the contact member being axially and rotationally fixed to the second one of the nut and the screw when electricity is provided to the valve actuator and when electricity is not provided to the valve actuator and the contact member being locked against rotation in the housing when electricity is provided to the valve actuator and when electricity is not provided to the valve actuator,
a resilient member between the contact member and the housing configured to bias the contact member in a first direction relative to the housing and being shiftable between a first state and a second state, a potential energy of the resilient member being higher in the first state than in the second state, and
a lock shiftable between a locked condition and an unlocked condition, the lock being selectively shiftable between the locked and the unlocked condition when electricity is being provided to the valve actuator and remaining in the unlocked condition or shifting automatically to the unlocked condition when electricity ceases to be provided to the valve actuator, the lock in the locked condition preventing relative rotation between the threaded nut and the threaded screw and the lock in the unlocked condition allowing relative rotation between the threaded nut and the threaded screw,
wherein, when the resilient member is in the first state and electricity ceases to be provided to the valve actuator, the lock is configured to automatically shift to the unlocked condition and allow the resilient member to shift to the second state and cause a relative rotation between the threaded nut and the threaded screw, and wherein the lock is configured to prevent relative rotation between the threaded nut and the threaded screw by preventing the threaded screw from rotating relative to the housing.

6. The valve actuator according to claim 5, wherein the resilient member comprises a spring or a spring washer or a disc spring and wherein the lock comprises one of a tooth clutch, a tooth brake, a torque lock, and a friction brake.

7. The valve actuator according to claim 6, wherein the second one of the nut and the screw comprises the screw and wherein the contact member is locked against axial movement relative to the screw.

8. The valve actuator according to claim 6, wherein the first one of the nut and the screw comprises the screw.

9. The valve actuator according to claim 5, further including:

an extension member extending from the second one of the contact member and the threaded screw and extending through an opening in the housing, and a valve part connected to the extension member, the valve part being movable in a controlled manner in a first direction when the electric motor generates a relative rotation in a first direction between the threaded nut and the threaded screw and being movable in a controlled manner in a second direction when the electric motor generates a relative rotation in a second direction between the threaded nut and the threaded screw and further being movable to a desired position in a controlled manner to control a flow in a pipe.

10. The valve actuator according to claim 5, wherein the lock comprises a clutch or a brake.

11. The valve actuator according to claim 5, wherein the lock comprises one of a tooth clutch, a tooth brake, a torque lock, and a friction brake.

* * * * *